(No Model.) 10 Sheets—Sheet 2.
G. & T. SHAW & J. P. DITCHFIELD.
MACHINERY FOR DRILLING HOLES IN STOCKS, &c., OF BRUSHES OR BROOMS.
No. 577,587. Patented Feb. 23, 1897.
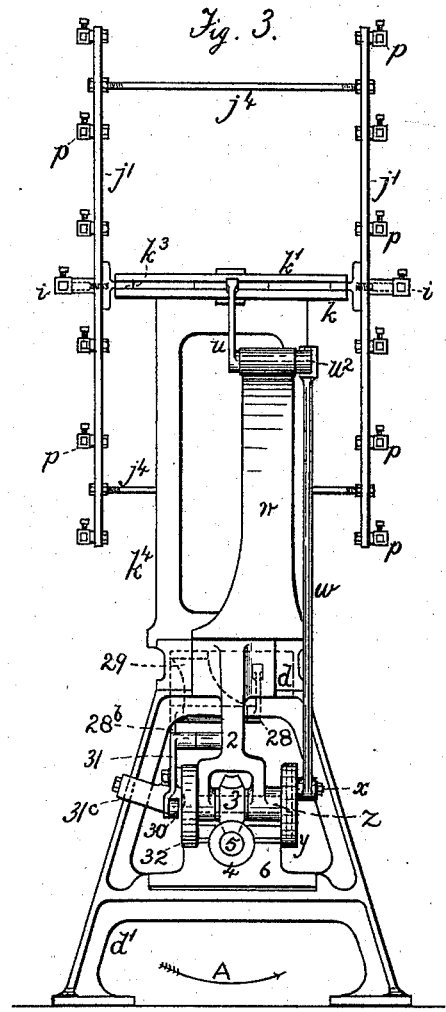
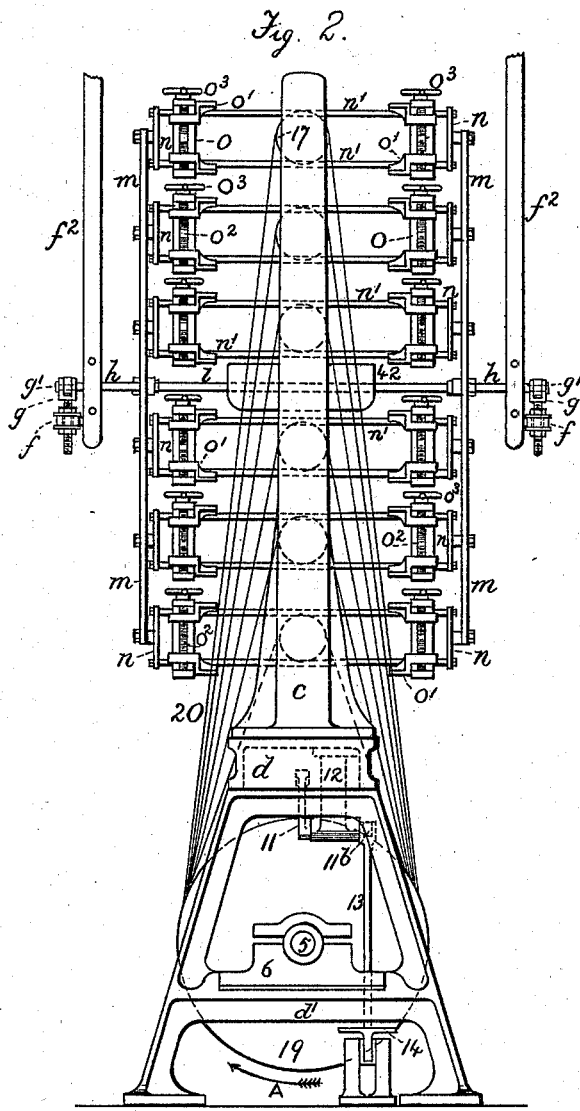

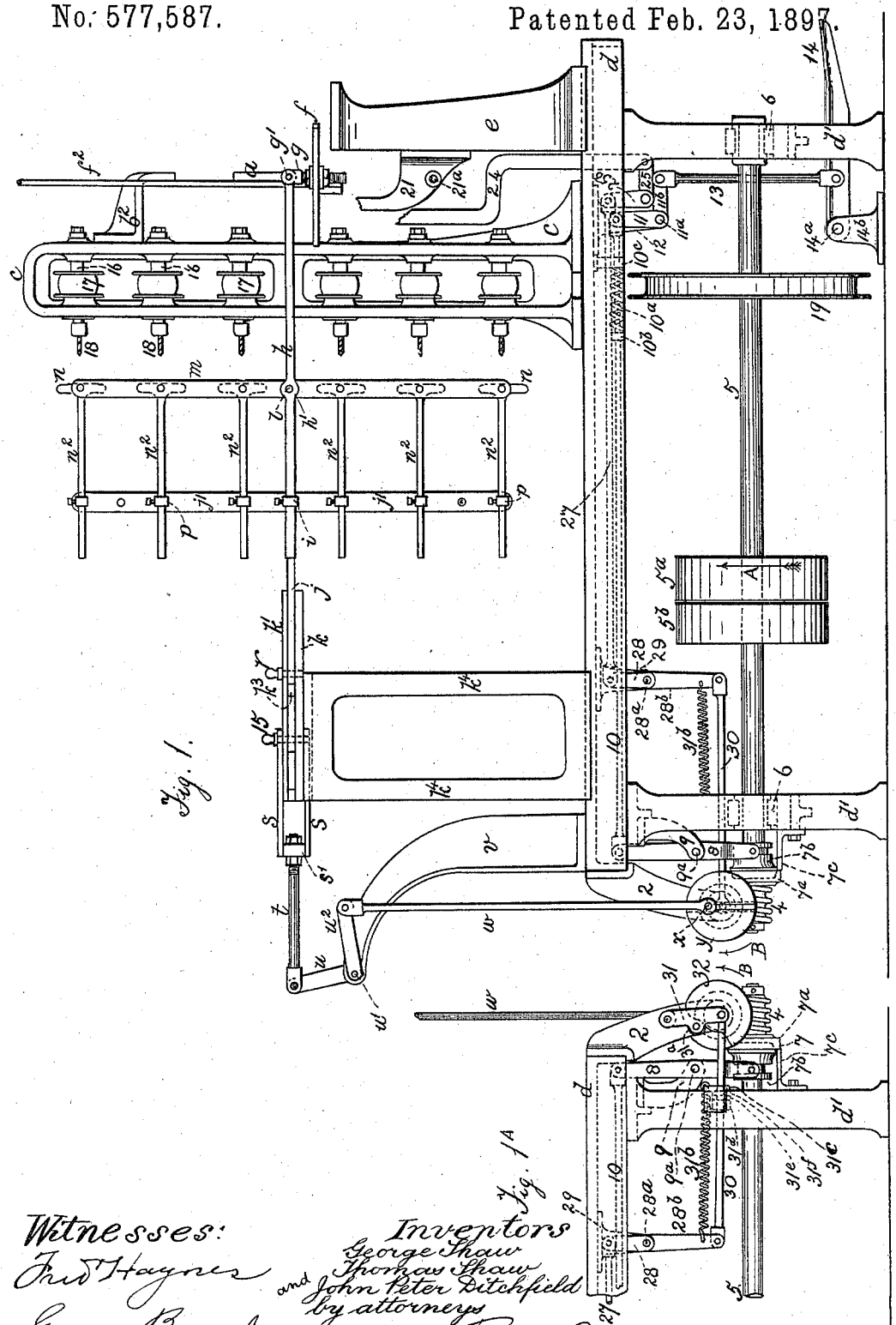

(No Model.) 10 Sheets—Sheet 3.
G. & T. SHAW & J. P. DITCHFIELD.
MACHINERY FOR DRILLING HOLES IN STOCKS, &c., OF BRUSHES OR BROOMS.
No. 577,587. Patented Feb. 23, 1897.
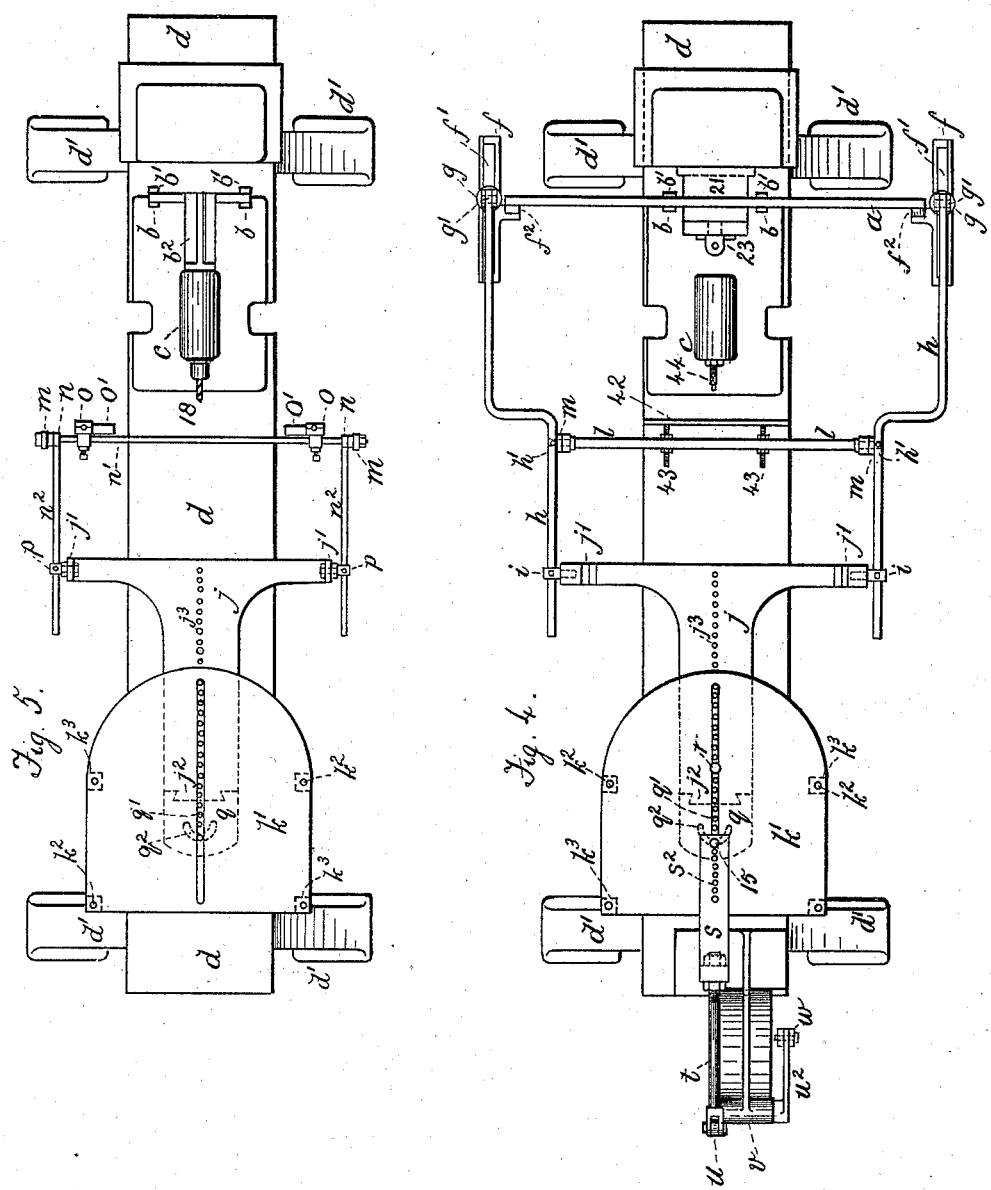

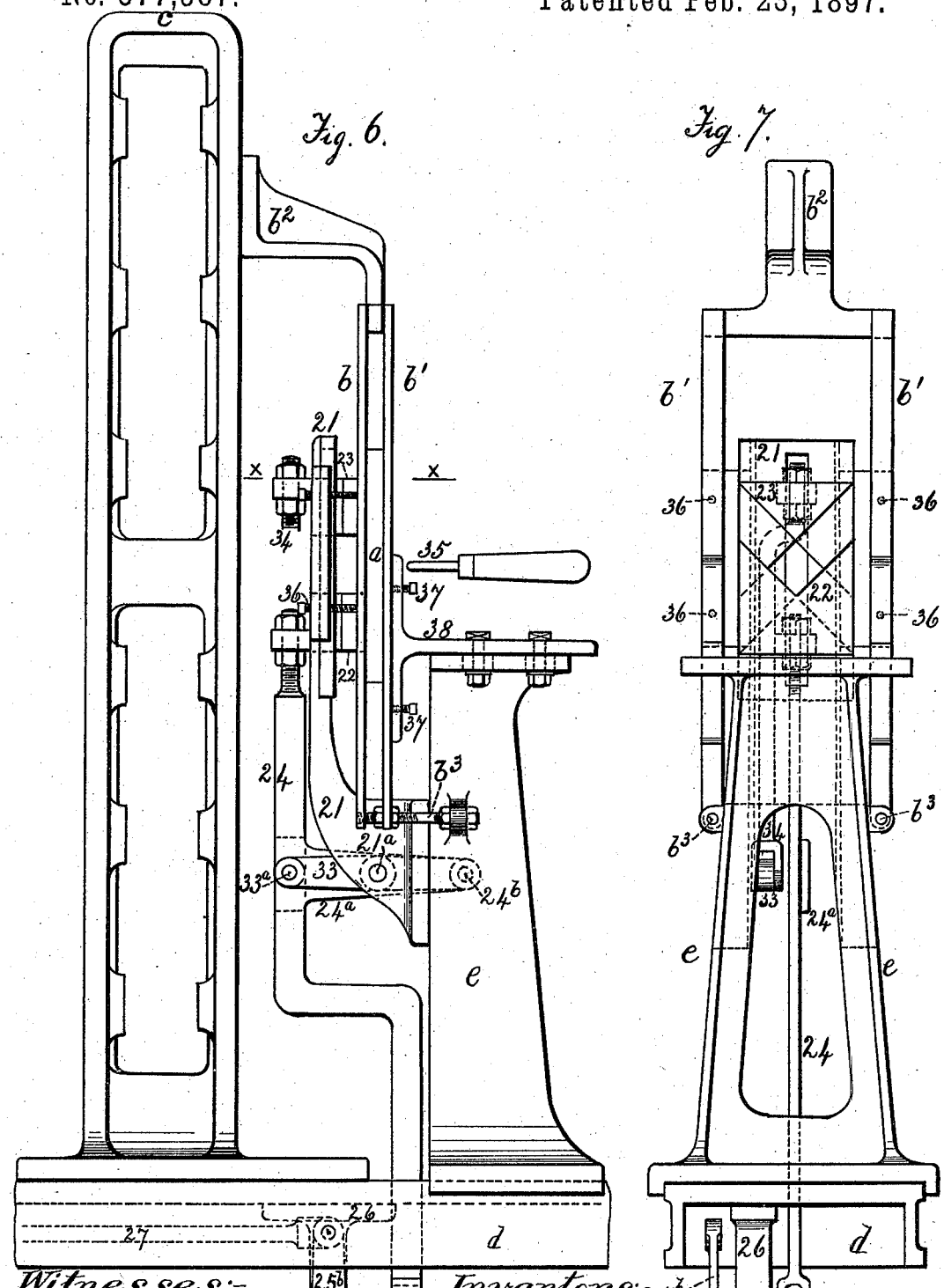

(No Model.) 10 Sheets—Sheet 5.
G. & T. SHAW & J. P. DITCHFIELD.
MACHINERY FOR DRILLING HOLES IN STOCKS, &c., OF BRUSHES OR BROOMS.
No. 577,587. Patented Feb. 23, 1897.
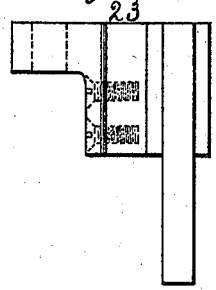
Fig. 8.
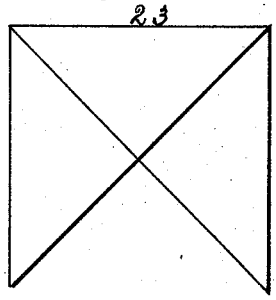
Fig. 9.
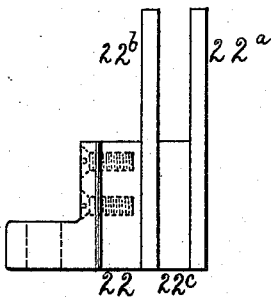
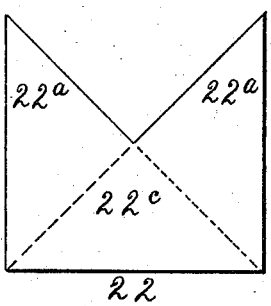
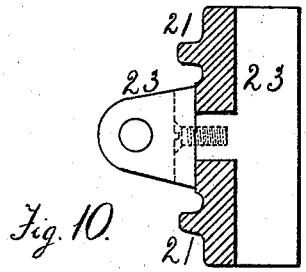
Fig. 10.
Witnesses:—
Fred Haynes
George Barry Jr.
Inventors:—
George Shaw
Thomas Shaw
and John Peter Ditchfield
by attorneys
Brown & Seward

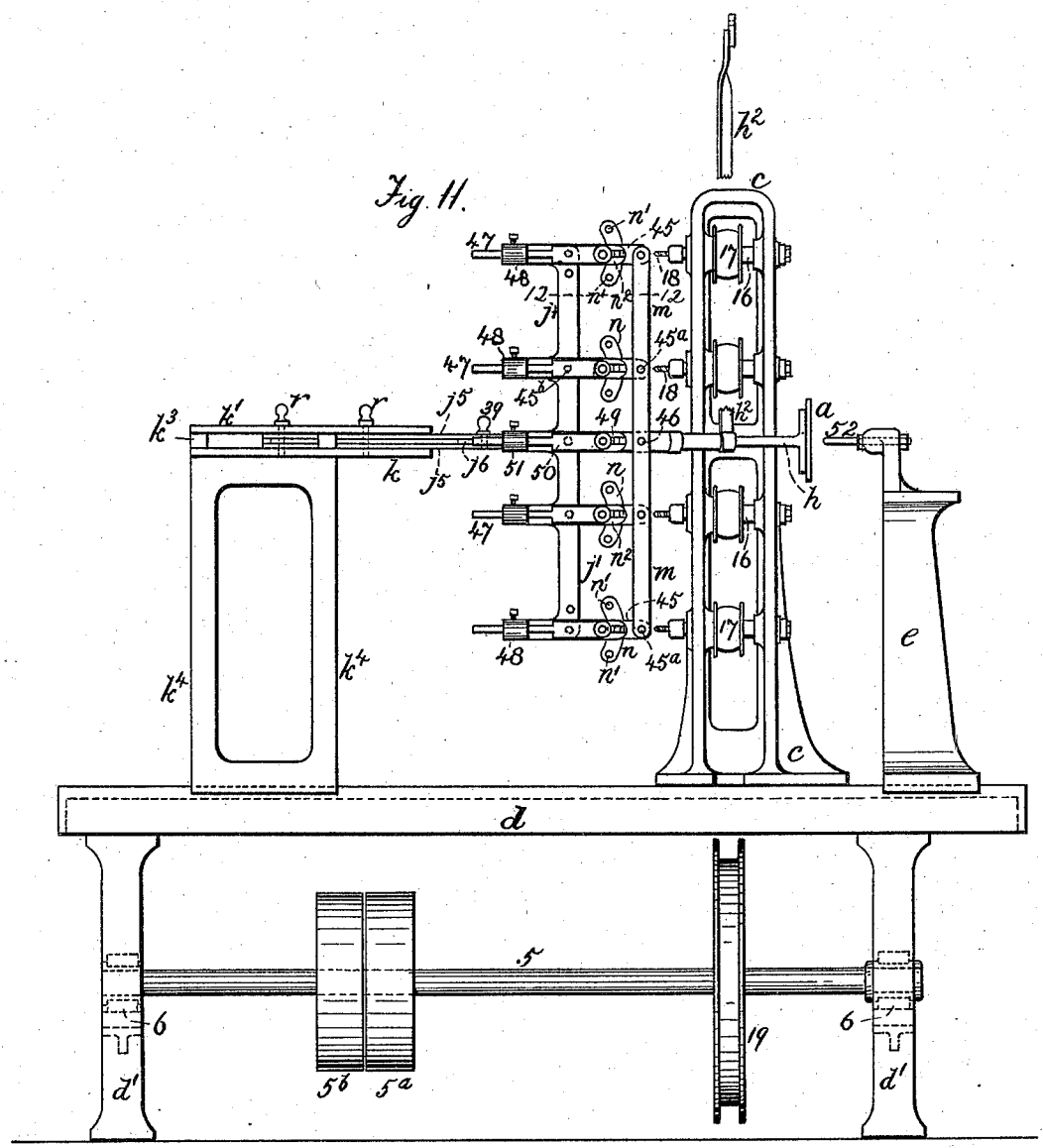

(No Model.) 10 Sheets—Sheet 7.
G. & T. SHAW & J. P. DITCHFIELD.
MACHINERY FOR DRILLING HOLES IN STOCKS, &c., OF BRUSHES OR BROOMS.
No. 577,587. Patented Feb. 23, 1897.
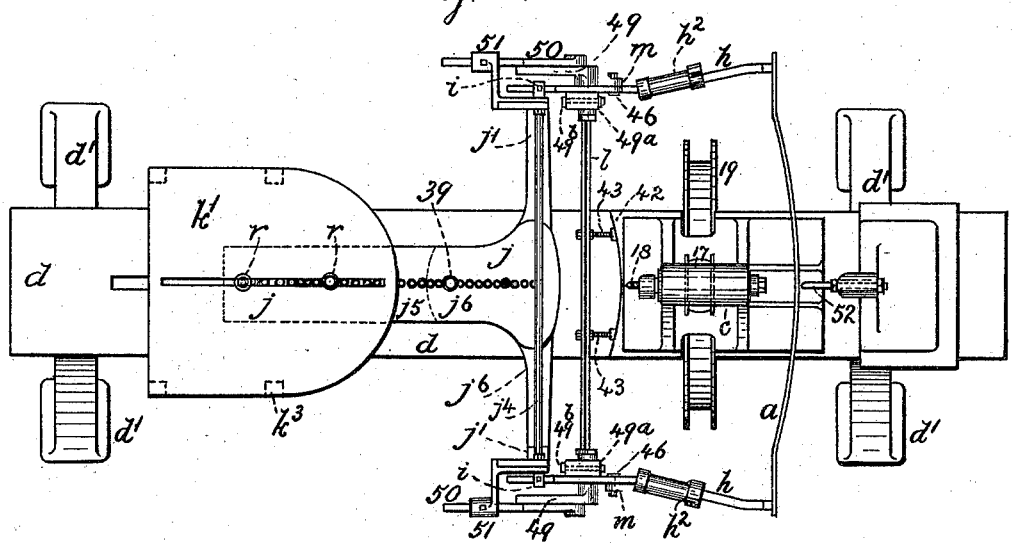

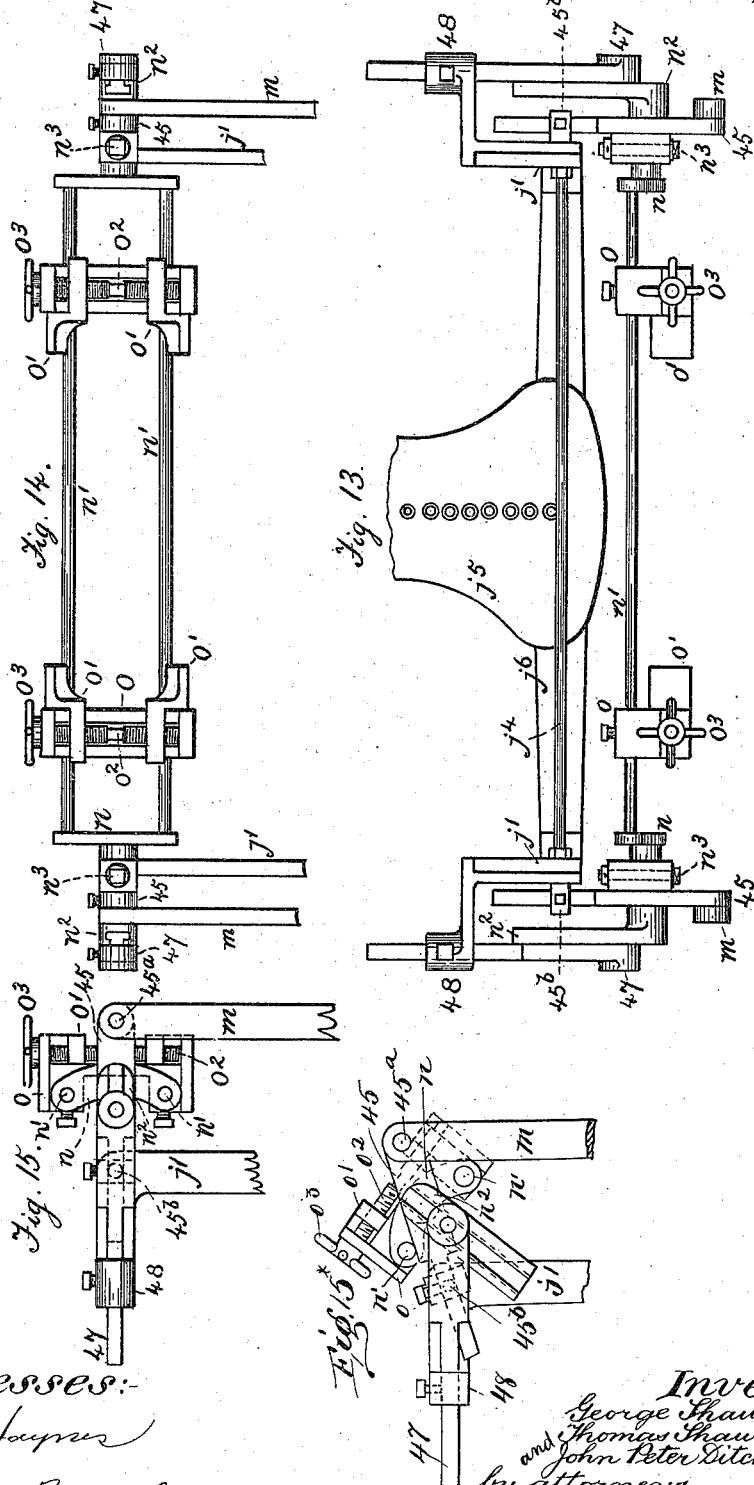

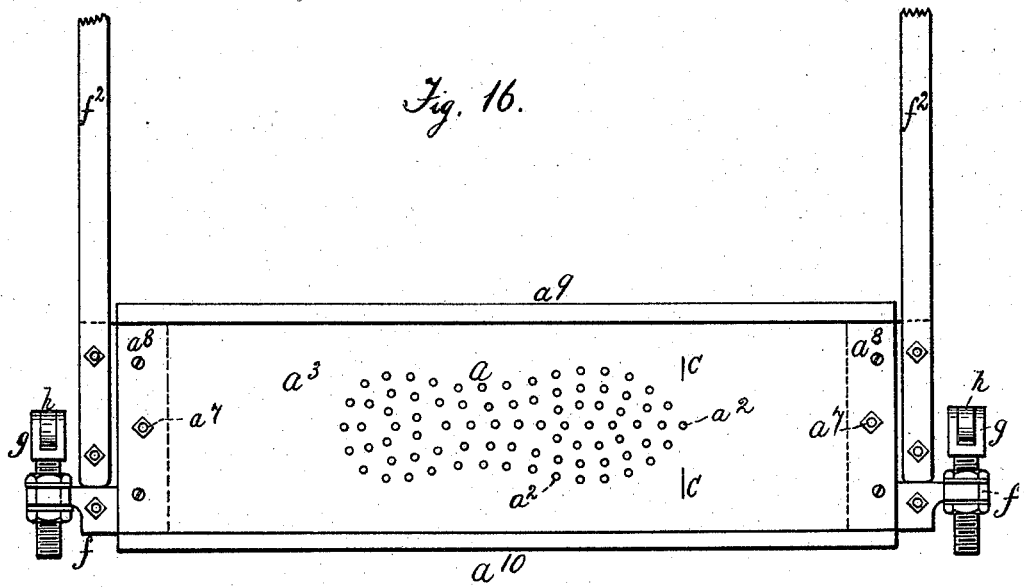

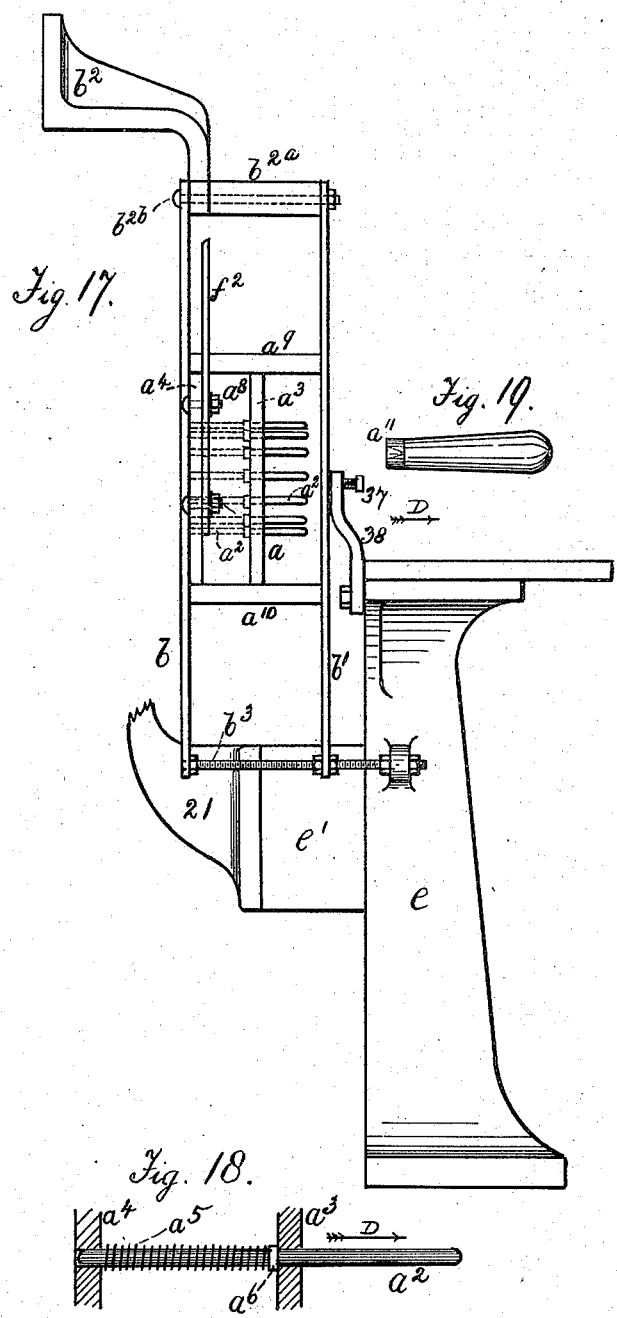

UNITED STATES PATENT OFFICE.

GEORGE SHAW, THOMAS SHAW, AND JOHN PETER DITCHFIELD, OF ASHTON-UNDER-LYNE, ENGLAND.

MACHINERY FOR DRILLING HOLES IN STOCKS, &c., OF BRUSHES OR BROOMS.

SPECIFICATION forming part of Letters Patent No. 577,587, dated February 23, 1897.

Application filed March 13, 1896. Serial No. 583,068. (No model.) Patented in England May 9, 1894, No. 9,157; in France May 9, 1895, No. 247,258, and in Austria November 24, 1895, No. 4,451.

*To all whom it may concern:*

Be it known that we, GEORGE SHAW and THOMAS SHAW, brush manufacturers, and JOHN PETER DITCHFIELD, manager, of Warre Street, Ashton-under-Lyne, in the county of Lancaster, England, have invented certain new and useful Improvements in Certain Machinery or Apparatus for Drilling Holes in the Boards or Stocks of Certain Kinds of Brushes or Brooms, (for which we have obtained Letters Patent of the United Kingdom of Great Britain and Ireland, No. 9,157, dated May 9, 1894; Brevet d'Invention of the Republic of France, dated May 9, 1895, No. 247,258, and Patent of the Empire of Austria, dated November 24, 1895, No. 4,451,) of which the following is a specification.

Our invention relates to machines or apparatus of the kind described in the specification forming part of Letters Patent of the United States of America, dated March 29, 1892, and numbered 471,709, granted unto us; and our invention consists in improvements by which machines of the kind above mentioned are rendered more efficient in operation.

Our invention consists in means by which it is made possible to bore or drill in one operation two or more boards or stocks simultaneously by distinct drills capable of revolution but incapable of longitudinal movement while using one templet, and to insure that all the holes shall be bored or drilled in the boards or stocks in the required positions and at the required inclinations; in means by which in certain kinds of machines constructed according to our invention some of the necessary movements of the brush boards or stocks being operated upon in a machine may be accomplished by means of gearing arranged in the machine instead of by the simple application of manual power to the templet employed in such machine, and in improvements in appliances for regulating the depth of the holes drilled by means of machines constructed according to our invention, which besides being applicable to the machines constructed according to our present invention are also applicable to machines such as are described in the specification forming part of the above-mentioned Letters Patent of the United States granted to us.

According to our invention, in constructing a machine we provide a templet arranged to be moved backward and forward or to and fro laterally or upward and downward or in any two or more of such modes, as may be necessary, according to the form of the boards or stocks for the drilling or boring of holes in which the machine is to be adapted and according to the manner in which it is desired that the machine shall operate. In conjunction with the said templet we provide as many holders or sets of parts for holding boards or stocks to be bored or drilled as it is desired to bore or drill by one operation in the machine, and so arrange such holders or sets of parts for holding boards or stocks that when the said templet is moved the said holders or sets of parts shall all be moved in a similar manner, so that all the brush boards or stocks held thereby shall be similarly and simultaneously presented to and withdrawn from the drills by means of which they are to be drilled or bored. The turning of the holders or parts by which the boards or stocks are held while being drilled necessary to enable the holes to be drilled at the required inclinations may be accomplished in cases in which a moderate amount of turning only is required by mounting or forming the said holders or sets of parts upon arms or similar parts connected at each end to an arm or frame or arms or frames and arranging the said arm or frame or arms or frames so that by one or both ends of the arms or similar parts upon which the said holders or sets of parts are mounted or formed being moved by the movements imparted to the templet employed the required movements of turning and translation may be imparted to the brush boards or stocks to be drilled. In cases in which a greater degree of turning movement is required to be given to the boards or stocks to be drilled the holders or sets of parts for holding the boards or stocks to be drilled may be mounted or formed upon arms or parts mounted upon suitable pivots in the parts moved with the templet employed and be arranged to be turned therein by being connected to arms or other equivalent means by which their movements of translation in relation to certain parts may be caused to bring about their turning.

A machine constructed according to our invention is provided with a number of drills corresponding to the number of boards or stocks to be simultaneously drilled, and according to our invention we cause each drill to be capable of revolving, but incapable of longitudinal movement, and preferably cause each drill to be driven by a separate strap and cause all the straps employed to receive motion from one pulley and to be placed one above another in their passage around the pulley from which they receive motion.

Our invention is illustrated in the accompanying drawings, in all the figures of which the same letters and numerals of reference are applied to corresponding parts.

One machine constructed according to our invention is illustrated by Figures 1, $1^a$, 2, 3, 4, 5, 6, 7, 8, 9, and 10 of the accompanying drawings. Fig. 1 is an elevation of one side of the machine with certain parts omitted in order that confusion may be avoided, and Fig. $1^a$ is an elevation of a portion of the other side of the machine. Fig. 2 is an elevation of one end of the machine with certain parts omitted in order that confusion may be avoided; and Fig. 3 is an elevation of the other end of the machine, also with certain parts omitted in order that confusion may be avoided. Figs. 4 and 5 are plans of the machine, each with certain parts omitted in order that confusion may be avoided and showing certain parts not shown by the other. In Fig. 6, which is a side elevation, in which part is indicated in outline only, and in Fig. 7, which is an end elevation of a portion of the machine, certain parts which are omitted from Figs. 1, 2, 3, 4, and 5 are shown. Figs. 6 and 7 are drawn upon a larger scale than Figs. 1, 2, 3, 4, and 5. Fig. 8 is a side elevation, Fig. 9 a front elevation, and Fig. 10 a plan, in part a section, taken on the line X X of Fig. 6. Fig. 11 is a side elevation, and Fig. 12 a plan, partly in section, on the line 12 12 of Fig. 11, illustrating another form of machine constructed according to our invention. Certain parts are omitted from Figs. 11 and 12 in order that confusion may be avoided, and in Fig. 13, which is a plan, Fig. 14, which is a front elevation, and Figs. 15 and $15^*$, which are side elevations, all drawn upon a larger scale than Figs. 11 and 12, there is illustrated one of four sets of parts for holding brush boards or stocks which are employed in the machine illustrated in Figs. 11 and 12. Figs. 16, 17, 18, and 19 illustrate a form of templet constructed according to our invention which is adapted for use in the machine illustrated in Figs. 1, 2, 3, 4, and 5 and is more convenient in use than the templet shown in Figs. 1, 4, and 6. Fig. 16 is a front elevation, and Fig. 17 a side elevation, of this form of templet, together with so much of the machine in which it is employed as is necessary for the explanation of the construction and employment of such templet. Fig. 18 is a vertical section taken on the plane indicated by the line C C of Fig. 16 and illustrating a portion of the templet shown in Figs. 16 and 17, and Fig. 19 illustrates an appliance which is employed in conjunction with the templet illustrated in Figs. 16 and 17.

The machine illustrated in Figs. 1, $1^a$, 2, 3, 4, 5, 6, 7, 8, 9, and 10 of the accompanying drawings is adapted to give a certain amount of turning movement to the brush boards or stocks being operated upon, so that a moderate amount of spread will be given to the tufts of bristles subsequently inserted in the holes drilled or bored in such brush boards or stocks, and the machine illustrated in Figs. 11 and 12 is adapted to give a greater amount of turning movement to the brush boards or stocks being operated upon, so that a greater amount of spread will be given to the tufts of bristles subsequently inserted in the holes drilled or bored in such brush boards or stocks.

In a machine constructed according to our invention the drills 18 employed, which in the machine illustrated in Figs. 1, $1^a$, 2, 3, 4, 5, 6, 7, 8, 9, and 10 are six in number and in the machine illustrated in Figs. 11 and 12 are four in number, are respectively mounted in chucks or holders preferably screwed upon screw-threads formed on the mandrels 16, by which they are respectively supported, which spindles or mandrels 16 are mounted in the standard $c$, mounted upon the bed $d$ of the machine. Each of the mandrels or spindles 16, which are respectively provided with pulleys 17, receives rotary motion by means of a separate belt 20 from a pulley 19, mounted fast upon a shaft 5, provided with a fast pulley $5^a$ and a loose pulley $5^b$ and revolving in bearings formed in pedestals 6, supported in the legs $d'$ of the machine. The belt 20, imparting motion to the lowest pulley 17, is placed in contact with the surface of the pulley 19, and the others pass outside it around the pulley 19 in an order corresponding to that of the pulleys 17, the belt 20, imparting motion to the uppermost pulley 17, being outermost in passing around the pulley 19. The pulleys 17 are preferably made of different sizes, such that although each of such belts 20 moves at a speed different from that of every other of such belts all the mandrels or spindles 16 shall revolve at approximately the same speed.

Although we prefer that motion shall be imparted to the drills 18 by means of a separate belt 20 for each drill and to superimpose the belts for the upper drills upon the belts transmitting motion to the lower drills in the manner above described, we may, whenever it may be considered desirable, cause motion to be imparted to the drills 18 by means of other arrangements, such, for instance, as a single belt transmitting motion to all the drills 18 in the machine.

The brush boards or stocks to be operated upon are mounted in clamps or jaws $o'$, capable of being moved upon slides upon brackets $o$ by means of right-hand and left-hand screw-threads formed upon axles $o^2$, each of which is provided with a handle $o^3$ and capable of being revolved, but not capable of moving endwise in the bracket $o$ in which it is mounted. The brackets $o$ are mounted upon rods $n'$, extending between opposite brackets $n$, and are secured in position upon such rods $n'$ by means of set-screws. Each pair of two opposite brackets $n$ supports two rods $n'$, which are secured by means of nuts screwed upon their ends in each of the brackets $n$, in which they are mounted, and support two of the brackets $o$. Each pair of brackets $n$ is so mounted in the machine that when the axes of the rods $n'$, carried by such brackets $n$, are in the same vertical plane the center of the space inclosed between such pair of brackets $n$ and the rods $n'$ carried thereby shall be in the same straight horizontal line as the axis of the drill 18, employed to operate upon the brush board or stock mounted in the jaws $o'$, supported by such pair of brackets $n$.

In the machine illustrated in Figs. 1, 1ª, 2, 3, 4, 5, 6, 7, 8, and 9 the brackets $n$ are supported and moved by each of them being formed with a stud passing through and secured by a nut and capable of being oscillated in one of two bars $m$, each of which bars $m$ supports six of the brackets $n$ and is mounted upon a rod $l$, which at each end enters and is secured by means of set-screws in eyes $h'$, each of which is formed in one of two rods $h$, which, as will be hereinafter described, may be caused to receive a backward-and-forward motion from the shaft 5 and are moved or turned upward and downward and laterally by means of the templet $a$. Each of the rods $h$ passes through and is secured by means of a set-screw in an eye formed in one of two studs $i$, each of which is capable of being oscillated in one of two arms formed upon a plate $j$, capable of being slid between plates $k\ k'$, which are secured together by bolts $k^2$ and kept at a certain distance apart by means of distance-pieces $k^3$ and are mounted upon a pedestal $k^4$, which is formed in one with the plate $k$ and is mounted upon the bed $d$ of the machine. The plate $j$ is formed with two arms $j'$, in each of which are mounted six studs $p$, each of which is secured by means of a nut and capable of being oscillated in the arm $j'$, in which it is mounted, and is formed with an eye through which passes an arm $n^2$, formed on one of the brackets $n$. Each arm $n^2$ is secured in position in the eye through which it passes by means of a set-screw screwed into such eye and bearing against the said arm $n^2$. The arms $j'$ are connected by rods $j^4$, each of which is secured at each end to one of such arms $j'$.

Each rod $h$ is connected to one of two studs $g$, each of which is mounted in and capable of being slid lengthwise of a slot $f'$, formed in one of two brackets $f$, each of which is formed of two parts secured together and is secured to one end of the templet $a$ employed in the machine. The studs $g$, while being capable of being slid lengthwise of the slots $f'$, in which they are respectively placed, are prevented from being displaced therefrom by means of nuts or collars caused to bear against the brackets $f$ and secured in position upon the studs $g$, upon which they are respectively screwed by means of lock-nuts. Each of the studs $g$ is formed with jaws, through which passes a pin $g'$, connecting to such stud $g$ the rod $h$ in conjunction with which it is employed, which rod $h$ is capable of turning about the pin $g'$, which passes through it.

The above-described arrangement of the bars $m$, arms $n^2$, studs $p$, arms $j'$, and rods $h$ causes all the brackets $n$ to be moved in a similar manner when the templet $a$ is moved laterally or upward or downward. The templet $a$, which is arranged so as to be capable of being moved upward and downward and sidewise in relation to the machine, is mounted between arms $b$ and arms $b'$. The arms $b$, of which there are two, one at each side of the machine, and the arms $b'$, of which also there are two, one at each side of the machine, are secured to projections formed upon a bracket $b^2$, secured to the standard $c$. A stud $b^3$, secured by means of lock-nuts to and in position in a projection formed upon a standard $e$, mounted upon the bed $d$ of the machine, is screwed into the bar $b$ at one side of the machine and passes through the bar $b'$ at the same side of the machine, which is secured in position upon such stud $b^3$ by lock-nuts, so that such bars $b\ b'$ are secured in position and at a suitable distance apart. Another stud $b^3$ at the other side of the machine in a similar manner secures the other bars $b\ b'$ in position and at a suitable distance apart. A rod or frame $f^2$, which is secured at its ends to the brackets $f$ and templet $a$, is connected to a cord which passes over a suitable pulley or pulleys supported in any suitable manner and is connected to a weight, by which the weight of the templet $a$ and the rods $h$ and the parts supported thereby is counterbalanced.

The plate $j$ is provided with a dovetail projection $j^2$, in engagement with which is placed a plate $q$, provided with a notch of a form corresponding with that of the dovetail projection $j^2$. The plate $q$ is kept in position upon the projection $j^2$ by means of the plates $k\ k'$, between which the plate $j$ and the plate $q$ may be slid.

The plate $j$ is formed with a number of holes $j^3$, in any one of which a pin $r$ may be placed, and the plate $q$ is also formed with a number of holes $q'$, in any one of which the pin $r$ may be placed. Slots are formed in the plates $k\ k'$ in order to allow the pin $r$ to be placed in the holes $j^3\ q'$, as may be desirable from time to time, and to act as guides, in which such pin $r$ may be slid. In the plate $q$ is formed a slot $q^2$, which is curved for a purpose to be hereinafter explained. Above the plate $k'$ and below the plate $k$ are plates $s$, secured together by means of a block $s'$, through which passes one end of a connecting-rod $t$. In the plates $s$ holes $s^2$ are formed, so that a pin 15 may be inserted into any one of the holes $s^2$ in the upper plate $s$ and through the slot $q^2$ in the plate $q$ into one of the holes $s^2$ in the lower plate $s$. The pin 15 in being inserted into the holes $s^2$ in the plates $s$ and passed through the slot $q^2$ will also be passed through the slots in the plates $k$ $k'$, which will act as guides for such pin 15. The rod $t$ is connected at one end to an arm $u$, mounted fast upon an axle $u'$, capable of being oscillated in bearings formed in a standard $v$, mounted upon the bed $d$ of the machine. The rod $t$ is provided with nuts, by which it is secured in position in the block $s'$. Upon the axle $u'$ is also mounted an arm $u^2$, to which is connected one end of a connecting-rod $w$, the other end of which embraces a stud $x$, secured in a block capable of being secured in any suitable position in a groove formed in a disk $y$, mounted fast upon a transverse shaft $z$, capable of being revolved in bearings provided in a bracket 2, secured to the bed $d$ of the machine. Fast upon the transverse shaft $z$ is mounted a worm-wheel 3, into which bears or engages a worm 4, mounted loose upon but prevented from being moved lengthwise of the shaft 5. Upon the worm 4 is formed one part $7^a$ of a friction-clutch 7, the other part $7^b$ of which is capable of being slid lengthwise upon the shaft 5 and of receiving motion therefrom. The part $7^b$ of the friction-clutch 7 is formed with a groove in which engage pins projecting from jaws formed on one arm of a lever 8, mounted upon a stud $9^a$, secured in a bracket 9, secured to one of the legs $d'$ of the machine. To the other arm of the lever 8 is connected one end of a rod 10, the other end of which is connected to an arm 11, mounted fast upon an axle $11^a$, capable of being oscillated in a bracket 12, secured to the bed $d$ of the machine. Fast upon the axle $11^a$ is also mounted an arm $11^b$, to which is connected one end of a rod 13, the other end of which is connected to a treadle 14, capable of being oscillated upon an axle $14^a$, passing through a bracket $14^b$, secured to the floor beneath the machine.

When the treadle 14 is depressed, the part $7^b$ of the friction-clutch 7 will be placed in engagement with the part $7^a$ of such friction-clutch 7, so that if the shaft 5 be revolving the shaft $z$ will also be caused to revolve, and by means of the stud $x$, connecting-rod $w$, arm $u^2$, axle $u'$, arm $u$, and rod $t$ cause the plates $s$ to be moved backward and forward, and by means of the pin 15 cause the plates $q$ $j$ to be moved backward and forward. A spring $10^a$, which is compressed to a suitable extent between a collar $10^b$, secured upon the rod 10, and a bracket $10^c$, secured to the lower side of the bed $d$ of the machine and serving as a guide to the rod 10, serves to raise the treadle 14 when such treadle 14 is released by the attendant and to disengage the part $7^b$ of the friction-clutch 7 from the part $7^a$ thereof, so as to arrest the backward and forward movements of the plates $s$.

A bracket $7^c$, secured to one of the legs $d'$ of the machine, serves to prevent the part $7^a$ of the clutch 7 from moving along with the part $7^b$ thereof when the treadle 14 is released, and so insures that the disengagement of the part $7^b$ of the clutch 7 from the part $7^a$ thereof and the cessation of the revolution of the shaft $z$ shall take place promptly when the treadle 14 is released. When the treadle 14 is depressed during the revolution of the shaft 5, the brush boards or stocks carried by the jaws $o'$ will be caused to advance toward and retire from the drills or other boring or drilling tools 18, and the portions of the said brush boards or stocks which are presented to the drills or other boring-tools 18 will depend upon the position in which the templet $a$ is placed. The stud $x$ must be secured in such position in the groove in the disk $y$ that the required amount of backward and forward motion may be given to the said brush boards or stocks. The templet $a$ is provided with holes arranged in accordance with the desired arrangement of the holes in the brush boards or stocks to be drilled, and is moved by means which we will now proceed to describe.

In a bracket 21, secured to the standard $e$, are mounted jaws 22 23, which are capable of being slid upward and downward in or upon guides formed or provided upon the said bracket 21. The construction of the jaws 22 23 is clearly illustrated by Figs. 8, 9, and 10 of the accompanying drawings. The jaw 22 is provided with two parts $22^a$ $22^b$, formed upon a block $22^c$, each of which parts $22^a$ $22^b$ is formed with a notch made somewhat in the shape of a V. As the two notches in the jaw 22 act as one notch, we shall for convenience refer to them as the notch in the jaw 22. The jaw 23 is provided with a notch made somewhat in the shape of an inverted V, and each of such jaws 22 23 is so formed as to be a counterpart of the other, the notched part of the jaw 23 being adapted to pass between the notched parts $22^a$ $22^b$ of the jaw 22.

Each of the jaws 22 23 is formed in two parts, one of which is adapted to bear upon one side of the bracket 21, while the other of such parts is adapted to bear upon the other side of the bracket 21, and one of the two parts of the said jaw is secured by set-screws to a projection formed upon the other of such parts and passing through the slot between the guides formed on the said bracket 21. A connecting-rod 24 is secured to the lower jaw 22 by means of a part of such connecting-rod, which passes through a lug formed upon the said jaw and is secured in position therein by means of nuts. The connecting-rod 24 is connected to an arm 25, mounted fast upon an axle $25^a$, capable of being oscillated in a bracket 26, secured upon the lower surface of the bed $d$ of the machine, fast upon which axle $25^a$ is mounted an arm $25^b$, to which is connected one end of a connecting-rod 27, which at its other end is connected to an arm 28, mounted fast upon an axle $28^a$, capable of being oscillated in a bracket 29, secured upon the lower surface of the bed $d$ of the machine. Fast upon the axle $28^a$ is also mounted an arm $28^b$, to which is connected one end of a connecting-rod 30, the other end of which embraces a stud projecting from a lever 31, capable of being oscillated upon a stud secured in the bracket 2. The lever 31 is provided with a bowl $31^a$, which is moved in one direction by means of a cam 32, mounted fast upon the shaft $z$, and in the other direction by means of the tension of a spring $31^b$, which is secured at one end to the arm $28^b$ and at the other end to a bracket $31^c$, which is secured to one of the legs $d'$ of the machine. The bracket $31^c$ is provided with a hole through which the connecting-rod 30 passes. When the shaft $z$ is caused to revolve, the revolution of the cam 31 and the tension of the spring $31^b$ will cause the axle $28^a$ to be oscillated and cause the jaw 22 to be moved upward and downward. To the connecting-rod 24 is secured a bracket $24^a$, secured in which is a stud $24^b$, which is embraced by one end of a lever 33, capable of being oscillated on a stud $21^a$, secured in the bracket 21. A connecting-rod 34, part of which passes through a lug formed on the upper jaw 23, embraces a pin $33^a$, secured in the lever 33. The upward and downward movements of the connecting-rod 24, causing the lever 33 to oscillate, cause the jaw 23 to be moved upward and downward, the downward movement of the jaw 23 taking place simultaneously with the upward movement of the rod 24 and jaw 22, and the upward movement of the jaw 23 taking place simultaneously with the downward movement of the jaw 22.

Upon the connecting-rod 30 a collar $31^d$ is secured, and upon such connecting-rod 30, between the collar $31^d$ and the bracket $31^c$, are placed a washer or collar $31^e$, of leather, and a washer or collar $31^f$, of india-rubber. The collar $31^d$ is secured upon the connecting-rod 30 in such position that the washers $31^e$ and $31^f$, of leather and india-rubber, will act as a buffer to arrest the movement of the connecting-rod 30 in one direction and prevent the termination of the downward movement of the jaw 22 from being accompanied by unnecessary shock. The movements of the jaws 22 23 are so adjusted that a pin 35, provided with a handle in order that it may be conveniently manipulated by the attendant in charge of the machine, may, having been previously placed in the space between the sides of the notch of the jaw 22 and the sides of the notch of the jaw 23, be held between such jaws 22 23 and in the apexes of the notches of such jaws 22 23. The pin 35 (shown only in Fig. 6) is shown removed from the space between the sides of the notches of the jaws 22 23 for convenience of illustration. The jaws 22 23 are preferably secured in such positions upon the connecting-rods 24 34, respectively, that the pin 35 when held by such jaws 22 23 shall have its axis in the horizontal plane passing through the centers of the plates $j$ $q$. It will be obvious that in whatever part of the space inclosed between the sides of the notch of the jaw 22 and the sides of the notch of the jaw 23 the pin 35 may be placed it will as such jaws 22 23 are brought together be brought to the apex of each of such notches.

The arrow A indicates the direction in which the shaft 5 is caused to revolve when the machine illustrated in Figs. 1, 2, 3, 4, 5, 6, 7, 8, 9, and 10 of the accompanying drawings is in use, and the arrow B indicates the direction in which the shaft $z$ is caused to revolve by the revolution of the shaft 5 when the part $7^b$ of the clutch 7 is placed in engagement with the part $7^a$ thereof.

The cam 32 is, as is indicated in Figs. 1 and $1^a$, so placed in relation to the groove in the disk $y$ that the jaws 22 23 may have completed their approach to one another at the time the plates $q$ $j$ commence to be moved toward the drills or boring-tools 18 and so that the jaws 22 23 may continue to hold the pin 35 until the brush boards or stocks being operated on are withdrawn clear of the drills or boring-tools 18.

In order that the templet $a$ may be properly guided by the arms $b$ $b'$ and in order that the wearing of the templet $a$ and arms $b$ $b'$ may be prevented from interfering with the proper guiding of the templet $a$ by the arms $b$ $b'$, we provide set-screws 36, by means of which the arms $b$ may be pressed toward the arms $b'$, and set-screws 37, by means of which the arms $b'$ may be pressed toward the arms $b$, so that the arms $b$ $b'$ may be caused to bear upon the templet $a$ as closely as may be desirable. The set-screws 36, of which two are employed in conjunction with each arm $b$, are screwed in projecting parts formed on the bracket 21 and the set-screws 37, of which two are employed in conjunction with each arm $b'$, are secured in brackets 38, secured to the standard $e$. The brackets 38 are omitted from Fig. 7 in order that confusion may be avoided.

When the machine illustrated in Figs. 1, 2, 3, 4, 5, 6, 7, 8, 9, and 10 of the accompanying drawings is in use and a brush board or stock to be drilled or bored has been secured in the jaws or clamps $o'$, carried by each pair of brackets $n$, while the frame formed by the rods $h$, arms $j'$, bars $m$, brackets $n$, and rods $n'$ is in such a position that the said brush boards or stocks when secured in the said jaws or clamps $o'$ are clear of the drills or boring-tools 18, and while the stud $x$ is in a position such that it will require to move through more than one-quarter of a revolution in the direction indicated by the arrow B before causing the said brush boards or stocks to move toward the drills or boring-tools 18, and a templet $a$, having formed in it holes arranged in accordance with the desired arrangement of the holes to be drilled or bored in the said brush boards or stocks, has been secured to the brackets $f$, the pin 35 is inserted into the space inclosed between the sides of the notches in the jaws 22 23 when such jaws 22 23 are respectively in their lowest and highest positions through one of the several holes in the templet $a$ which may be opposite to the said space. Then the treadle 14 being depressed the shaft $z$ will be caused to revolve and the jaws 22 23 will be brought against the pin 35 in the manner above described and, if it be not in the position into which the movement of the jaws 22 23 is adapted to bring it, will move such pin 35, and also the templet $a$, into a position such that the pin 35 may be held between the deepest parts of the notches in the jaws 22 23 in the manner above described. After the templet $a$, if not already in the said position, has been moved into it and while the templet $a$ is held in such position the brush boards or stocks supported by the brackets $n$ will be presented to the drills or boring-tools 18 and each be drilled with a hole by one of such drills or boring-tools 18 and then withdrawn therefrom.

When the pin 35 is released by the jaws 22 23, the attendant in charge of the machine, removing the pin 35 from the hole in the templet $a$, in which it was first placed, passes it into the space inclosed between the sides of the notches in the jaws 22 23, when such jaws are respectively in their lowest and highest positions, through another hole in the templet $a$, which may be opposite to the said space, so that when the jaws 22 23 are again moved upward and downward, respectively, into their highest and lowest positions the pin 35 and templet $a$ will be moved thereby, so as to move the brackets $f$ and cause the rods $h$, carrying the arms $m$, to be so guided that the brush boards or stocks supported by the brackets $n$ will each be drilled with another hole in the required position. The attendant in charge of the machine passes the pin 35 into the space between the sides of the notches of the jaws 22 23 in the manner above described through one hole in the templet $a$ after another until a hole has been drilled in each of the brush boards or stocks being operated upon to correspond with each of the holes in the templet $a$ or with each of any desired number of such holes. If at any time the attendant in charge of the machine should fail to move the pin 35 from one hole in the templet $a$ to another, when the hole corresponding to the first of such holes has been drilled in each of the brush-boards or stocks supported by the brackets $n$, the said brush boards or stocks will be again presented to the drills or boring-tools 18 in the position in which they were previously presented to such drills or boring-tools, which will thus be caused to again enter the holes previously drilled or bored by them.

The lateral movement of the templet $a$ in either direction from its central position causes the plate $j$ to be turned upon the pin $r$, and the upward and downward movements of the templet $a$ from its central position cause the rods $h$ and studs $i$ to be turned in relation to the plate $j$ and cause the brackets $n$ to be turned in the bars $m$, and thus the holes drilled in the brush boards or stocks supported by the brackets $n$ will differ in inclination thereto, so that a certain amount of what is termed "spread" will be given to the bristles afterward inserted in such brush boards or stocks.

The turning of the plate $j$ about the stud $r$, caused by the templet $a$ being moved laterally from its central position, causes the parts of the brush boards or stocks which are presented to the drills or boring-tools 18 to be moved nearer to the said drills or boring-tools apart from any movement of the stud 15, and as it is necessary that all the holes in the brush boards or stocks supported by the brackets $n$ shall be of approximately the same diameter at the backs of such brush boards or stocks it is necessary that the distance between the stud 15 and the portions of the said brush boards or stocks to be presented to the drilling or boring tools 18 shall be reduced by an amount corresponding to the distance by which the portions of such brush boards or stocks to be drilled or bored are caused to advance toward the drills or boring-tools 18 by the turning of the plate $j$ upon the stud $r$. We therefore form the slot $q^2$ in the plate $q$ curved, so that as the plate $j$ is turned about the stud $r$ and turns the plate $q$ the stud 15 will be caused to occupy different positions in the slot $q^2$, so that the distance between such stud 15 and the stud $r$ will be caused to vary according to the position into which the plate $j$ may be turned upon the stud $r$. By plates $q$, provided with slots $q^2$ of different forms suitable for use in different cases, being provided in substitution for the plate $q$ the distance between the stud 15 and the portions of the brush boards or stocks carried by the brackets $n$ may be prevented from being materially varied by the turning of the plate $j$ about the stud $r$, caused by the templet $a$, used in any particular case, being moved into different positions laterally. The plate $j$ is formed with the dovetail projection $j^2$, in order that different plates $q$ may be readily substituted for one another as may be necessary or desirable from time to time.

In the machine illustrated in Figs. 11 and 12 each of the brackets $n$ is provided with a stud or projection secured and capable of being oscillated in one of eight arms 45, of which there are four at each side of the machine. Each of the arms 45 is capable of being oscillated at one end about a stud $45^a$, secured by nuts in one of two bars $m$, which are mounted and capable of being oscillated upon studs 46, secured in rods $h$, similar to the rods $h$ of the machine illustrated in Figs. 1, 2, 3, 4, and 5, except in so far that the rods $h$ of the machine illustrated in Figs. 11 and 12 are connected directly to the templet $a$ employed in such machine and are made capable of being adjusted in length by being each formed in two parts, secured together by a set-screw.

The weight of the templet $a$ and rods $h$ and the parts supported thereby is counterbalanced by means of a weight connected to a cord, which passes over suitable pulleys and is connected to a frame $h^2$, connected by set-screws to the rods $h$. Each of the rods $h$ of the machine illustrated in Figs. 11 and 12 is secured by means of a set-screw in one of two studs $i$, each of which is secured and capable of being oscillated in one of two arms $j'$, projecting from a plate $j$, capable of being slid between plates $k\ k'$, mounted upon a standard $k^4$, formed in one with the plate $k$ and supported by the bed $d$ of the machine. In the machine illustrated in Figs. 11 and 12 the plate $j$ is formed in two parts $j^5\ j^6$, the part $j^5$ being made so as to be capable of being slid or oscillated between the plates $k\ k'$ and the part $j^6$ being capable of being oscillated horizontally in the part $j^5$. Each of the parts $j^5\ j^6$ of the plate $j$ is formed with a number of holes adapted to receive a stud or studs 39, by which such parts may be connected together either so that the part $j^6$ may be turned in relation to the part $j^5$ or so that both of such parts $j^5\ j^6$ will be caused to move together according to the movement which it is desired to give to the brush boards or stocks to be operated upon. When one stud 39 is employed to connect the parts $j^5\ j^6$ of the plate $j$ together, as is indicated in Figs. 11 and 12, the part $j^6$ may be turned about such stud 39 in relation to the part $j^5$, and when two studs 39 are employed to connect the parts $j^5\ j^6$ such parts will move together and act as one plate $j$. In Figs. 11 and 12 two studs $r$ are shown as being inserted in the part $j^5$ of the plate $j$ and into the slots extending lengthwise of the plates $k\ k'$, which slots act as guides for such studs $r$, so that the part $j^5$ of the plate $j$ can only be moved backward and foward in a straight line, the necessary turning in a horizontal plane of the brush boards or stocks being provided for by the parts $j^5\ j^6$ of the plate $j$, being only connected together by one stud 39. If only one stud $r$ be placed in the slots of the plates $k\ k'$ and in the part $j^5$ of the plate $j$ and the parts $j^5\ j^6$ be connected together by two studs 39, the turning in a horizontal plane of the brush boards or stocks being operated upon will take place about the axis of the stud $r$, inserted in the slots of the plates $k\ k'$ and the part $j^5$ of the plate $j$. The axis about which the turning in a horizontal plane of the brush boards or stocks being operated upon shall take place may thus be caused to be that of a stud $r$, inserted in the slots of the plates $k\ k'$ and in the part $j^5$ of the plate $j$, or that of a stud 39, inserted into the two parts $j^5\ j^6$ of the plate $j$, as may be desirable from time to time, according to the form of the brush boards or stocks being operated upon. At its other end each of the arms 45 is capable of being oscillated about the axis of a stud $45^b$, secured in one of the arms $j'$, projecting from the plate $j$. Each of the brackets $n$ is provided with an arm $n^2$, which, being secured upon the stud projecting from such bracket, secures it in the arm 45 in which it is mounted. In the arm $n^2$ of each bracket $n$ are formed guides, between which may be slid a block capable of being oscillated upon a stud secured in one of a number of rods 47, which are respectively capable of being secured in various positions, as may be desirable from time to time, in sockets 48, formed on the arms $j'$, projecting from the plate $j$. In each of the rods $h$ is mounted a bracket $49^a$, which is capable of being oscillated in the rod $h$ in which it is mounted, and extending between the brackets $49^a$ is a rod 1, which at its ends is connected to blocks capable of being adjusted in position in the brackets $49^a$ by means of screws $49^b$. The said rod 1 supports a stop-plate 42, such as will be hereinafter described. Each of the brackets $49^a$ is provided with an arm 49, in which are formed guides, between which may be slid a block capable of being oscillated upon a stud projecting from one of two rods 50, which are respectively capable of being secured in various positions, as may be desirable from time to time, in sockets 51, formed in the arms $j'$, projecting from the plate $j$. By the rods 50 being adjusted into proper position the brackets $49^a$ may be caused to oscillate to the same extent as the brackets $n$ when the rods $h$ are raised or lowered, and by means of the screws $49^b$ the distance of the stop-plate 42 from the axis about which it is turned may be adjusted, as may be necessary or desirable, and each bracket $n$ being provided with a screw $n^3$ similar to the screws $49^b$, which is mounted in a block provided in such bracket and capable of being turned to adjust one part of such bracket $n$ in position in relation to another part thereof, the distance of the brush boards or stocks being operated upon from the axes about which they are respectively caused to oscillate may be adjusted as may be necessary or desirable. When the templet $a$ is raised or lowered, the rods $h$ being turned about the axes of the eyes $i$ and the bars $m$ being raised and lowered the arms 45 will be oscillated about the axes of the studs $45^a\ 45^b$, and the oscillation of the arms 45 causing the brackets $n$ to be moved in relation to the rods 47, the blocks which are capable of being oscillated upon the studs respectively projecting from such rods 47 and engage with the guides formed in the arms $n^2$ of such brackets $n$ will cause such brackets $n$ to be oscillated in relation to the arms 45, so that the turning of the arms 45, brought about by the raising and lowering of the templet $a$, will cause the brackets $n$ and the brush boards or stocks supported thereby to be oscillated to a greater extent than the arms 45.

The extent of the oscillation of the brackets $n$ and the brush boards or stocks supported thereby may be varied by the rods 47 being adjusted longitudinally into different positions in relation to the brackets $n$. The templet $a$ in the machine illustrated in Figs. 11 and 12 is arranged to be moved by the attendant in charge of the machine, and is provided with holes arranged in a suitable manner, which are placed or guided one after another onto a pin or guide 52, carried by a standard $e$, mounted upon the bed $d$ of the machine. The depth of the holes bored or drilled in the brush boards or stocks supported by the brackets $n$ or the extent to which the drills or boring-tools 18 are caused to penetrate the said brush boards or stocks is regulated by the stop-plate 42, supported by the rod 1, which will be hereinafter further described, and which is made of a form corresponding to that of the brush boards or stocks being operated upon, and is caused by the arms 49 and rods 50 to be turned in a manner corresponding to that in which the said brush boards or stocks are turned, so that the position of the said stop-plate 42 will always correspond with that of the brush boards or stocks being operated upon. The backward and forward movements of the rods $h$ and plate $j$ necessary to present and withdraw the brush boards or stocks being operated upon to and from the drills or boring-tools 18 in the machine illustrated in Figs. 11 and 12 are arranged to be obtained by the templet $a$ being moved backward and forward by the attendant in charge of the machine, as the turning of the brush boards or stocks being operated upon, caused by the upward and downward movements of the templet $a$, renders it difficult to arrange for the requisite backward and forward movements of the said brush boards or stocks to be produced mechanically.

We would have it understood that if it be considered preferable in any case the machine illustrated in Figs. 1, 2, 3, 4, and 5 may be provided with a templet mounted and moved vertically and laterally by hand, like the templet $a$ illustrated in Figs. 11 and 12, and that in such case if the stud 15 be removed from the plates $s$ and the plate $q$ the backward and forward movements and the lateral turning of the plate $j$ and the brush boards or stocks supported by the jaws $o'$ may be all accomplished by the said templet being moved by hand.

When a machine of the kind illustrated in Figs. 1, 2, 3, 4, and 5 is provided with a templet mounted and moved vertically and laterally by hand, like the templet $a$ illustrated in Figs. 11 and 12, the backward and forward movements of the brush boards or stocks being operated upon may, when accomplished by means of the movements of the stud $x$, be limited by the position in which such stud $x$ is secured in the disk $y$, and in cases in which machines constructed according to our invention are provided with templets moved backward and forward and laterally and vertically by hand, as in the machine illustrated in Figs. 11 and 12, the forward movement of the templet may be limited by means of a stop surrounding the pin 52, as in the machines illustrated in the drawings accompanying the specification forming part of the Letters Patent of the United States granted to us and numbered 471,709 and dated March 29, 1892.

There are provided in the templet $a$ illustrated in Figs. 16 and 17 a number of pins $a^2$, which are severally mounted in holes formed in the boards $a^3$ $a^4$, forming with the pins $a^2$ the templet $a$, and are provided with springs $a^5$, bearing against collars $a^6$ on the pins $a^2$ with which they are respectively used and against the board $a^4$ and tending to force such pins $a^2$ in the direction indicated by the arrow D. The pins $a^2$ are arranged in the boards $a^3$ $a^4$ in a manner corresponding to the manner in which it is desired that holes shall be bored in the brush boards or stocks to be operated upon, and the boards $a^3$ $a^4$ are secured together by bolts $a^7$, passing through them and through blocks $a^8$, placed between such boards $a^3$ $a^4$, and by being secured by screws to such blocks $a^8$. The templet $a$, formed by the boards $a^3$ $a^4$ and the pins $a^2$, is provided at its upper and lower parts, respectively, with boards $a^9$ $a^{10}$ and is mounted in the machine similarly to the templet $a$ illustrated in Figs. 1, 4, and 6, the arms $b$ $b'$ and pedestal $e$ being placed in suitable positions and a filling-piece $e'$ being placed between the pedestal $e$ and the bracket 21 in order that the bracket 21 may remain in proper position for the jaws 22 23 to be properly operated and filling-pieces $b^{2a}$ being placed between each of the arms $b'$ used with such templet and the bracket $b^2$, to which such arms $b'$ are secured by bolts $b^{2b}$, of which only one is shown in Fig. 17.

The tool $a^{11}$ (illustrated in Fig. 19) is formed with a cup adapted to be placed upon the projecting parts of the pins $a^2$, and is also so formed that when placed upon the projecting part of one pin $a^2$ it shall be incapable of touching any of the other pins $a^2$ adjacent thereto. By means of the said tool $a^{11}$ the pins $a^2$ are pressed, one at a time, into the space between the sides of the notch in the jaw 22 and the sides of the notch in the jaw 23, so that as such jaws 22 23 respectively ascend and descend the templet $a$ will be moved into such position that the pin $a^2$ so pushed into the said space shall be held between the apexes of the notches in the jaws 22 23 when such jaws 22 23 are respectively in their highest and lowest positions. The templet $a$ being thus moved will cause the brush boards or stocks being operated upon to be moved in a corresponding manner. In order that holes arranged in different manners may be drilled in brush boards or stocks, it is necessary to provide boards $a^3$ $a^4$ with holes arranged in the various modes requisite, and the pins $a^2$ and springs $a^5$ may be transferred from one pair of boards $a^3$ $a^4$ to another, or different pairs of boards $a^3$ $a^4$, each fitted with a suitable number of pins $a^2$, furnished with springs $a^5$, may be provided for use at different times in the manufacture of different kinds of brush boards or stocks. In order that the templet $a$ may be properly guided by the arms $b$ $b'$ and in order that the wearing of the boards $a^9$ $a^{10}$ and arms $b$ $b'$ may be prevented from interfering with the proper guiding of the templet $a$ by the arms $b$ $b'$, there are provided two brackets 38, each of which is secured by means of a set-screw to the pedestal $e$ and is provided with a screw 37, which may be caused to bear to a suitable extent upon one of the arms $b'$ and press it toward the adjacent arm $b$, and there are also provided screws 36, (not shown in Figs. 16 and 17, but similar and arranged similarly to those shown in Fig. 6,) which may be caused to bear upon the arms $b$ and press them toward the adjacent arms $b'$.

We provide, in conjunction with the templet by means of which the holes drilled in brush boards or stocks by means of machines constructed according to our invention are caused to be drilled in the required positions and at the requisite inclinations, a plate of suitable size, connected in any suitable manner to the templet or any suitable part connected to such templet, which plate is so made and arranged that it can be adjusted and secured by means of a screw or nut, or screws or nuts or other device or devices, in any suitable position in relation to such templet, and provide a stud or stop which may be adjusted and secured by a screw or nut, or screws or nuts or other devices, in any suitable position in a stationary part of the machine, so that by the said plate or the said stud or such plate and stud or stop being adjusted into and secured in a suitable position or positions the extent to which the templet above mentioned may be moved in one direction may be limited as may be necessary.

In the accompanying drawings, 42 is the plate, which we provide in conjunction with the templet $a$. The plate 42 is secured, by means of screws 43, provided with lock-nuts, to the bar 1 above mentioned. The screws 43 and the lock-nuts on the screws 43 enable the plate 42 to be adjusted into and secured in position in relation to the bar 1 and in relation to a stud 44, which, being omitted from Figs. 11 and 12 in order that confusion may be avoided, is indicated in Fig. 4 and is mounted so as to be capable of being adjusted endwise in the standard $c$, mounted upon the bed $d$ of the machine, and is capable of being secured in position therein by means of a lock-nut. The plate 42 is mounted upon the bar 1 in such position that when the rods $h$ are in a horizontal position and at equal distances from the vertical plane containing the axes of the drills or boring-tools 18 the central portion of the plate 42 shall be in line with the axis of the stud 44, which is in the same vertical plane as the axes of the drills 18. The plate 42 is also adjusted into and secured in such position that its front surface shall be in the same vertical plane as or in a vertical plane at a suitable distance from the backs of the brush boards or stocks mounted in the jaws or clamps upon the rods $n'$, and the drills or boring-tools 18 are so made and mounted that their points shall all be in one vertical plane. In consequence of being mounted and adjusted in position in the said manner the plate 42 is moved similarly to and to the same extent as the brush boards or stocks supported upon the rods $n'$ and by arriving against the stud 44 in the forward motion of the said brush boards or stocks limits the forward movement of the brush boards or stocks, and thus regulates the extent to which the drills or boring-tools 18 may be caused to enter the said brush boards or stocks. The stop-plate 42 is made to correspond in form with the brush boards or stocks being operated upon, and being moved similarly to such brush boards or stocks renders it possible to insure that all the holes drilled or bored in such brush boards or stocks shall penetrate or pass through such brush boards or stocks to approximately the same extent, although the brush boards or stocks may vary somewhat in thickness.

In the machine illustrated in Figs. 1, 2, 3, 4, 5, and 6, in which the employment of the plate $q$ with the curved slot $q^2$ and the rigid connection of the connecting-rod $t$ with the block $s'$ and the adjustment and securing of the stud $x$ in proper position in the disk $y$ insure that the requisite amount of motion shall be given to the plates $q$ $j$ by the revolution of the stud $x$, the plate 42 when set in proper position will by tending to prevent the frame formed by the arms or bars $m$, arms $j'$, rods $j^4$, bar 1, brackets $n$, and rods $n'$ from being distorted by any tendency which the drills or boring-tools 18, if in the form of twist-drills, may have to screw themselves into the holes tend to prevent such drills or boring-tools 18 from unduly entering the brush boards or stocks being bored or drilled, and such plate 42 will also when set in proper position serve as an abutment or stop to prevent the plate $j$ from being moved farther forward than the most forward position into which it may be allowable to bring it for the drilling of the holes in any particular brush boards or stocks for the drilling of which the machine may require to be set at any time, and by so acting as an abutment or stop to such plate $j$ will hold such plate $j$ in position while the block in which the stud $x$ is secured is being adjusted into proper position in the groove in the disk $y$ and will so facilitate the setting of such stud $x$ in the different positions requisite from time to time.

Although illustrated in the accompanying drawings as applied to machines in which several brush boards or stocks are simultaneously subjected to the action of distinct drills by the use of one templet, the plate 42 and stud or stop 44 may be applied to machines of the kind described in the specification forming part of the Letters Patent of the United States numbered 471,709, granted unto the said George Shaw, Thomas Shaw, and John Peter Ditchfield.

What we claim, and desire to secure by Letters Patent, is—

1. In a machine for drilling holes in the boards or stocks of brushes and brooms, the combination of a number of drills 18, capable of revolution but incapable of longitudinal movement, a templet $a$, rods $h$ moved vertically and laterally by means of such templet $a$, holders or sets of parts for holding brush boards or stocks to be drilled equal in number to the drills 18 and supported upon the rods $h$ so as to be moved vertically and laterally thereby, a plate $j$ connected to the said rods $h$ and provided with arms $j'$ in which are provided studs formed with eyes which respectively embrace arms connected to the apparatus by which the brush boards or stocks to be drilled are held and so cause such boards or stocks to be turned when moved vertically, means to support and guide the said plate $j$, an adjustable stop-plate 42 supported by the rods $h$ and moved similarly to the brush boards or stocks to be drilled, an adjustable stud 44 to act as a stop to such stop-plate 42, a shaft $z$ carrying a disk provided with a crank-pin to move the said plate $j$ backward and forward, a clutch to bring the said shaft $z$ into connection as required with the driving-shaft 5 of the machine and means to connect the said crank-pin to the said plate $j$, said means consisting partly of a stud 15, passed through a curved slot $q^2$ in a plate $q$, secured to the said plate $j$, all arranged, employed, and operating for the purposes and substantially in the manner hereinbefore described.

2. In a machine for drilling holes in the boards or stocks of brushes and brooms, the combination of a number of drills 18 capable of revolution but incapable of longitudinal movement, all receiving motion from one pulley 19 by means of separate belts superimposed in passing around such pulley 19, a templet $a$, rods $h$ moved vertically and laterally by means of such templet $a$, holders or sets of parts for holding brush boards or stocks to be drilled equal in number to the drills 18 and supported upon the rods $h$ so as to be moved vertically and laterally thereby, a plate $j$ connected to the said rods $h$ and provided with arms $j'$ in which are provided studs formed with eyes which respectively embrace arms connected to the apparatus by which the brush boards or stocks to be drilled are held and so cause such brush boards or stocks to be turned when moved vertically, means to support and guide the said plate $j$, an adjustable stop-plate 42 supported by the rods $h$ and moved similarly to the brush boards or stocks to be drilled, an adjustable stud 44 to act as a stop to such stop-plate 42, a shaft $z$ carrying a disk provided with a crank-pin $x$ to move the said plate $j$ backward and forward, a clutch to bring the said shaft $z$ into connection as required with the driving-shaft 5 of the machine and means to connect the said crank-pin to the said plate $j$, said means consisting partly of a stud 15 passed through a curved slot $q^2$ in a plate $q$ secured to the said plate $j$, all arranged, employed and operating for the purposes and substantially in the manner hereinbefore described.

3. In a machine for drilling holes in the boards or stocks of brushes and brooms, the combination of a number of drills 18, capable of revolution but incapable of longitudinal movement, a templet $a$, means for moving such templet $a$, rods $h$ moved vertically and laterally by means of such templet $a$, holders or sets of parts for holding brush boards or stocks to be drilled equal in number to the drills 18 and supported upon the rods $h$ so as to be moved vertically and laterally thereby, a plate $j$ connected to the said rods $h$ and provided with arms $j'$ in which are provided studs formed with eyes which respectively embrace arms connected to the apparatus by which the brush boards or stocks to be drilled are held, and so cause such brush boards or stocks to be turned when moved vertically, means to support and guide the said plate $j$, an adjustable stop-plate 42 supported by the rods $h$ and moved similarly to the brush boards or stocks to be drilled, an adjustable stud 44 to act as a stop to such stop-plate 42 a shaft $z$ carrying a disk provided with a crank-pin to move the said plate $j$ backward and forward, a clutch to bring the said shaft $z$ into connection as required with the driving-shaft 5 of the machine and means to connect the said crank-pin to the said plate $j$, said means consisting partly of a stud 15 passed through a curved slot $q^2$ in a plate $q$ secured to the said plate $j$, all arranged, employed and operating for the purposes and substantially in the manner hereinbefore described.

4. In a machine for drilling holes in the boards or stocks of brushes and brooms the combination of a number of drills 18 capable of revolution but incapable of longitudinal movement, all receiving motion from one pulley 19 by means of separate belts superimposed in passing around such pulley 19, a templet $a$, means for moving such templet $a$, rods $h$ moved vertically and laterally by means of such templet $a$, holders or sets of parts for holding brush boards or stocks to be drilled equal in number to the drills 18 and supported upon the rods $h$ so as to be moved vertically and laterally thereby, a plate $j$ connected to the said rods $h$ and provided with arms $j'$ in which are provided studs formed with eyes which respectively embrace arms connected to the apparatus by which the brush boards or stocks to be drilled are held, and so cause such brush boards or stocks to be turned when moved vertically, means to support and guide the said plate $j$, an adjustable stop-plate 42 supported by the rods $h$ and moved similarly to the brush boards or stocks to be drilled, an adjustable stud 44 to act as a stop to such stop-plate 42, a shaft $z$ carrying a disk provided with a crank-pin $x$ to move the said plate $j$ backward and forward, a clutch to bring the said shaft $z$ into connection as required with the driving-shaft 5 of the machine, and means to connect the said crank-pin to the said plate $j$, said means consisting partly of a stud 15 passed through a curved slot $q^2$ in a plate $q$ secured to the said plate $j$, all arranged, employed and operating for the purposes and substantially in the manner hereinbefore described.

5. In a machine for drilling holes in the boards or stocks of brushes and brooms, the combination of a number of drills 18, capable of revolution but incapable of longitudinal movement, a templet $a$, reciprocating jaws 22 23 to move such templet vertically and laterally, rods $h$ moved vertically and laterally by means of such templet $a$, holders or sets of parts for holding brush boards or stocks to be drilled equal in number to the drills 18 and supported upon the rods $h$ so as to be moved vertically and laterally thereby, a plate $j$ connected to the said rods $h$ and provided with arms $j'$ in which are provided studs formed with eyes which respectively embrace arms connected to the apparatus by which the brush boards or stocks to be drilled are held and so cause such brush boards or stocks to be turned when moved vertically, means to support and guide the said plate $j$, means to move the said plate $j$ backward and forward, and means to move the said jaws 22 23, all arranged, employed and operating for the purposes and substantially in the manner hereinbefore described.

6. In a machine for drilling holes in the boards or stocks of brushes and brooms, the combination of a number of drills 18, capable of revolution but incapable of longitudinal movement, a templet $a$, reciprocating jaws 22 23 to move such templet $a$ vertically and laterally, rods $h$ moved vertically and laterally by means of such templet $a$, holders or sets of parts for holding brush boards or stocks to be drilled equal in number to the drills 18 and supported upon the rods $h$ so as to be moved vertically and laterally thereby, a plate $j$ connected to the said rods $h$ and provided with arms $j'$ in which are provided studs formed with eyes which respectively embrace arms connected to the apparatus by which the brush boards or stocks to be drilled are held and so cause such brush boards or stocks to be turned when moved vertically, means to support and guide the said plate $j$, means to move the said plate $j$ backward and forward, and means to move the said jaws 22 23, all arranged, employed and operating for the purposes and substantially in the manner hereinbefore described.

7. In a machine for drilling holes in the boards or stocks of brushes and brooms, the combination of a number of drills 18, capable of revolution but incapable of longitudinal movement, all receiving motion from one pulley 19 by means of separate belts superimposed in passing around such pulley 19, a templet $a$, reciprocating jaws 22 23 to move such templet $a$ vertically and laterally, rods $h$ moved vertically and laterally, by means of such templet $a$, holders or sets of parts for holding brush boards or stocks to be drilled equal in number to the drills 18 and supported upon the rods $h$ so as to be moved vertically and laterally thereby, a plate $j$ connected to the said rods $h$ and provided with arms $j'$ in which are provided studs formed with eyes which respectively embrace arms connected to the apparatus by which the brush boards or stocks to be drilled are held and so cause such brush boards or stocks to be turned when moved vertically, means to support and guide the said plate $j$, means to move the said plate $j$ backward and forward and means to move the said jaws 22 23, all arranged, employed and operating for the purposes and substantially in the manner hereinbefore described.

8. In a machine for drilling holes in the boards or stocks of brushes and brooms, the combination of a number of drills 18, capable of revolution but incapable of longitudinal movement, all receiving motion from one pulley 19 by means of separate belts superimposed in passing around such pulley 19, a templet $a$, reciprocating jaws 22 23 to move such templet $a$ vertically and laterally, rods $h$ moved vertically and laterally by means of such templet $a$, holders or sets of parts for holding brush boards or stocks to be drilled equal in number to the drills 18 and supported upon the rods $h$ so as to be moved vertically and laterally thereby, a plate $j$ connected to the said rods $h$ and provided with arms $j'$ in which are provided studs formed with eyes which respectively embrace arms connected to the apparatus by which the brush boards or stocks to be drilled are held and so cause such brush boards or stocks to be turned when moved vertically, means to support and guide the said plate $j$, an adjustable stop-plate 42 supported by the rods $h$ and moved similarly to the brush boards or stocks being drilled or bored, an adjustable stud 44 to act as a stop to such stop-plate 42, means to move the said plate $j$ backward and forward and means to move the said jaws 22 23, all arranged, employed and operating for the purposes and substantially in the manner hereinbefore described.

9. In a machine for drilling holes in the boards or stocks of brushes and brooms, the combination of a number of drills 18, capable of revolution but incapable of longitudinal movement, a templet $a$ reciprocating jaws 22 23 to move such templet $a$ vertically and laterally, rods $h$ moved vertically and laterally by means of such templet $a$, holders or sets of parts for holding brush boards or stocks to be drilled equal in number to the drills 18 and supported upon the rods $h$ so as to be moved vertically and laterally thereby, a plate $j$ connected to the said rods $h$ and provided with arms $j'$ in which are provided studs formed with eyes which respectively embrace arms connected to the apparatus by which the brush boards or stocks to be drilled are held and so cause such brush boards or stocks to be turned when moved vertically, means to support and guide the said plate $j$, a shaft $z$ carrying a cam 32 to actuate the said jaws 22 23 and a disk provided with a crank-pin $x$ to move the said plate $j$ backward and forward, and a clutch to bring the said shaft $z$ into connection as required with the driving-shaft 5 of the machine, and means to connect the said crank-pin to the said plate $j$, said means consisting partly of a stud 15 passed through a curved slot $q^2$ in a plate $q$ secured to the said plate $j$, all arranged, employed and operating for the purposes and substantially in the manner hereinbefore described.

10. In a machine for drilling holes in the boards or stocks of brushes and brooms, the combination of a number of drills 18 capable of revolution but incapable of longitudinal movement, a templet $a$ reciprocating jaws 22 23 to move such templet $a$ vertically and laterally, rods $h$ moved vertically and laterally by means of such templet $a$, holders or sets of parts for holding brush boards or stocks to be drilled equal in number to the drills 18 and supported upon the rods $h$ so as to be moved vertically and laterally thereby, a plate $j$ connected to the said rods $h$ and provided with arms $j'$ in which are provided studs formed with eyes which respectively embrace arms connected to the apparatus by which the brush boards or stocks to be drilled are held and so cause such brush boards or stocks to be turned when moved vertically, means to support and guide the said plate $j$, an adjustable stop-plate 42 supported by the rods $h$ and moved similarly to the brush boards or stocks being drilled, an adjustable stud 44 to act as a stop to such stop-plate 42, a shaft $z$ carrying a cam 32 to actuate the said jaws 22 23 and a disk provided with a crank-pin $x$ to move the said plate $j$ backward and forward, a clutch to bring the said shaft into connection as required with the driving-shaft 5 of the machine and means to connect the said crank-pin to the said plate $j$ said means consisting partly of a stud 15 passed through a curved slot $q^2$ in a plate $q$ secured to the said plate $j$, all arranged, employed and operating for the purposes and substantially in the manner hereinbefore described.

11. In a machine for drilling holes in the boards or stocks of brushes and brooms, the combination of a number of drills 18 capable of revolution but incapable of longitudinal movement, all receiving motion from one pulley 19 by means of separate belts superimposed in passing around such pulley 19 a templet $a$, reciprocating jaws 22 23 to move such templet $a$ vertically and laterally, rods $h$ moved vertically and laterally by means of such templet $a$, holders or sets of parts for holding brush boards or stocks to be bored or drilled equal in number to the drills 18 and supported upon the rods $h$ so as to be moved vertically and laterally thereby, a plate $j$ connected to the said rods $h$ and provided with arms $j'$ in which are provided studs formed with eyes which respectively embrace arms connected to the apparatus by which the brush boards or stocks to be drilled are held and so cause such brush boards or stocks to be turned when moved vertically, means to support and guide the said plate $j$, a shaft $z$ carrying a cam 32 to actuate the said jaws 22 23 and a disk provided with a crank-pin to move the said plate $j$ backward and forward and a clutch to bring the said shaft $z$ into connection as required with the driving-shaft 5 of the machine, and means to connect the said crank-pin to the said plate $j$, said means consisting partly of a stud 15 passed through a curved slot $q^2$ in a plate $q$ secured to the said plate $j$, all arranged, employed and operating for the purposes and substantially in the manner hereinbefore described.

12. In a machine for drilling holes in the boards or stocks of brushes and brooms, the combination of a number of drills 18 capable of revolution but incapable of longitudinal movement, all receiving motion from one pulley 19 by means of separate belts superimposed in passing around such pulley 19 a templet $a$, reciprocating jaws 22 23 to move such templet $a$ vertically and laterally, rods $h$ moved vertically and laterally by means of such templet $a$, holders or sets of parts for holding brush boards or stocks to be bored or drilled equal in number to the drills 18 and supported upon the rods $h$ so as to be moved vertically and laterally thereby, a plate $j$ connected to the said rods $h$ and provided with arms $j'$ in which are provided studs formed with eyes which respectively embrace arms connected to the apparatus by which the brush boards or stocks to be drilled are held and so cause such brush boards or stocks to be turned when moved vertically, means to support and guide the said plate $j$, an adjustable stop-plate 42 supported by the rods $h$ and moved similarly to the brush boards or stocks to be drilled, an adjustable stud 44 to act as a stop to such stop-plate 42, a shaft $z$ carrying a cam 32 to actuate the said jaws 22 23 and a disk provided with a crank-pin $x$ to move the said plate $j$ backward and forward, a clutch to bring the said shaft $z$ into connection when required with the driving-shaft 5 of the machine, and means to connect the said crank-pin to the said plate $j$ said means consisting partly of a stud 15 passed through a curved slot $q^2$ in a plate $q$ secured to the said plate $j$, all arranged, employed and operating for the purposes and substantially in the manner hereinbefore described.

13. In a machine for drilling holes in the boards or stocks of brushes and brooms, the combination of a number of drills 18 capable of revolution but incapable of longitudinal movement, a templet $a$, formed of pins $a^2$ mounted and capable of being moved in boards, reciprocating jaws 22 23 to act upon the said pins $a^2$ when pressed into the space between such jaws 22 23 and so move the said templet $a$ vertically and laterally, rods $h$ moved vertically and laterally by means of such templet $a$, holders or sets of parts for holding brush boards or stocks to be drilled equal in number to the drills 18 and supported upon the rods $h$ so as to be moved vertically and laterally thereby, a plate $j$ connected to the said rods $h$ and provided with arms $j'$ in which are provided studs formed with eyes which respectively embrace arms connected to the apparatus by which the brush boards or stocks to be drilled are held and so cause such brush boards or stocks to be turned when moved vertically, means to support and guide the said plate $j$, means to move the said plate $j$ backward and forward, and means to move the said jaws 22 23, all arranged, employed and operating for the purposes and substantially in the manner hereinbefore described.

14. In a machine for drilling holes in the boards or stocks of brushes and brooms, the combination of a number of drills 18 capable of revolution but incapable of longitudinal movement, a templet $a$ formed of pins $a^2$ mounted and capable of being moved in boards, reciprocating jaws 22 23 to act upon the said pins $a^2$ when pressed into the space between such jaws 22 23 and so move such templet vertically and laterally, rods $h$ moved vertically and laterally by means of such templet $a$, holders or sets of parts for holding brush boards or stocks to be drilled equal in number to the drills 18 and supported upon the rods $h$ so as to be moved vertically and laterally thereby, a plate $j$ connected to the said rods $h$ and provided with arms $j'$ in which are provided studs formed with eyes which respectively embrace arms connected to the apparatus by which the brush boards or stocks to be drilled are held and so cause such brush boards or stocks to be turned when moved vertically, means to support and guide the said plate $j$, a shaft $z$ carrying a cam 32 to actuate the said jaws 22 23 and a disk provided with a crank-pin $x$ to move the said plate $j$ backward and forward, a clutch to bring the said shaft $z$ into connection as required with the driving-shaft 5 of the machine, and means to connect the said crank-pin to the said plate $j$ said means consisting partly of a stud 15 passed through a curved slot $q^2$ in a plate $q$ secured to the said plate $j$, all arranged, employed and operating for the purposes and substantially in the manner hereinbefore described.

15. In a machine for drilling holes in the boards or stocks of brushes and brooms, the combination of a number of drills 18 capable of revolution but incapable of longitudinal movement, a templet $a$ formed of pins $a^2$ mounted and capable of being moved in boards, reciprocating jaws 22 23 to act upon the said pins $a^2$ when pressed into the space between such jaws 22 23 and so move such templet vertically and laterally, rods $h$ moved vertically and laterally by means of such templet $a$, holders or sets of parts for holding brush boards or stocks to be drilled equal in number to the drills 18 and supported upon the rods $h$ so as to be moved vertically and laterally thereby, a plate $j$ connected to the said rods $h$ and provided with arms $j'$ in which are provided studs formed with eyes which respectively embrace arms connected to the apparatus by which the brush boards or stocks to be drilled are held and so cause such brush boards or stocks to be turned when moved vertically, means to support and guide the said plate $j$, an adjustable stop-plate 42 supported by the rods $h$ and moved similarly to the brush boards or stocks being drilled, an adjustable stud 44 to act as a stop to such stop-plate 42, a shaft $z$ carrying a cam 32 to actuate the said jaws 22 23 and a disk provided with a crank-pin $x$ to move the said plate $j$ backward and forward, a clutch to bring the said shaft $z$ into connection as required with the driving-shaft 5 of the machine, and means to connect the said crank-pin to the said plate $j$ said means consisting partly of a stud 15 passed through a curved slot $q^2$ in a plate $q$ secured to the said plate $j$, all arranged, employed and operating for the purposes and substantially in the manner hereinbefore described.

16. In a machine for drilling holes in the boards or stocks of brushes and brooms, the combination of a number of drills 18 capable of revolution but incapable of longitudinal movement, all receiving motion from one pulley 19 by means of separate belts superimposed in passing around such pulley 19, a templet $a$ formed of pins $a^2$ mounted and capable of being moved in boards, reciprocating jaws 22 23 to act upon the said pins $a^2$ when pressed into the space between such jaws 22 23 and so move the said templet $a$ vertically and laterally, rods $h$ moved vertically and laterally by means of such templet $a$, holders or sets of parts for holding brush boards or stocks to be drilled equal in number to the drills 18 and supported upon the rods $h$ so as to be moved vertically and laterally thereby, a plate $j$ connected to the said rods $h$ and provided with arms $j'$ in which are provided studs formed with eyes which respectively embrace arms connected to the apparatus by which the brush boards or stocks to be drilled are held and so cause such brush boards or stocks to be turned when moved vertically, means to support and guide the said plate $j$, means to move the said plate $j$ backward and forward and means to move the said jaws 22

23 all arranged, employed and operating for the purposes and substantially in the manner hereinbefore described.

17. In a machine for drilling holes in the boards or stocks of brushes and brooms, the combination of a number of drills 18 capable of revolution but incapable of longitudinal movement, all receiving motion from one pulley 19 by means of separate belts superimposed in passing around such pulley 19, a templet $a$ formed of pins $a^2$ mounted and capable of being moved in boards, reciprocating jaws 22 23 to act upon the said pins $a^2$ when pressed into the space between such jaws 22 23 and so move the said templet $a$ vertically and laterally, rods $h$ moved vertically and laterally by means of such templet $a$, holders or sets of parts for holding brush boards or stocks to be drilled equal in number to the drills 18 and supported upon the rods $h$ so as to be moved vertically and laterally thereby, a plate $j$ connected to the said rods $h$ and provided with arms $j'$ in which are provided studs formed with eyes which respectively embrace arms connected to the apparatus by which the brush boards or stocks to be drilled are held and so cause such brush boards or stocks to be turned when moved vertically, means to support and guide the said plate $j$ an adjustable stop-plate 42 supported by the rods $h$ and moved similarly to the brush boards or stocks being drilled, an adjustable stud 44 to act as a stop to such stop-plate 42, means to move the said plate $j$ backward and forward and means to move the said jaws 22 23, all arranged employed and operating for the purposes and substantially in the manner hereinbefore described.

18. In a machine for drilling holes in the boards or stocks of brushes and brooms, the combination of a number of drills 18, capable of revolution but incapable of longitudinal movement, all receiving motion from one pulley 19 by means of separate belts superimposed in passing around such pulley 19, a templet $a$ formed of pins $a^2$ mounted and capable of being moved in boards, reciprocating jaws 22 23 to act upon the said pins $a^2$ when pressed into the space between such jaws 22 23 and so move such templet $a$ vertically and laterally, rods $h$ moved vertically and laterally by means of such templet $a$, holders or sets of parts for holding brush boards or stocks to be drilled equal in number to the drills 18 and supported upon the rods $h$ so as to be moved vertically and laterally thereby, a plate $j$ connected to the said rods $h$ and provided with arms $j'$ in which are provided studs formed with eyes which respectively embrace arms connected to the apparatus by which the brush boards or stocks to be drilled are held, and so cause such brush boards or stocks to be turned when moved vertically, means to support and guide the said plate $j$, a shaft $z$ carrying a cam 32 to actuate the said jaws 22 23 and a disk provided with a crank-pin $x$ to move the said plate $j$ backward and forward, a clutch to bring the said shaft $z$ into connection as required with the driving-shaft 5 of the machine, and means to connect the said crank-pin to the said plate $j$, said means consisting partly of a stud 15 passed through a curved slot $q^2$ in a plate $q$ secured to the said plate $j$, all arranged, employed and operating for the purposes and substantially in the manner hereinbefore described.

19. In a machine for drilling holes in the boards or stocks of brushes and brooms the combination of a number of drills 18 capable of revolution but incapable of longitudinal movement, all receiving motion from one pulley 19 by means of separate belts superimposed in passing around such pulley 19, a templet $a$ formed of pins $a^2$ mounted and capable of being moved in boards, reciprocating jaws 22 23 to act upon the said pins $a^2$ when pressed into the space between such jaws 22 23 and so move such templet $a$ vertically and laterally rods $h$ moved vertically and laterally by means of such templet $a$, holders or sets of parts for holding brush boards or stocks to be bored or drilled equal in number to the drills 18 and supported upon the rods $h$ so as to be moved vertically and laterally thereby, a plate $j$ connected to the said rods $h$ and provided with arms $j'$ in which are provided studs formed with eyes which respectively embrace arms connected to the apparatus by which the brush boards or stocks to be drilled are held and so cause such brush boards or stocks to be turned when moved vertically, means to support and guide the said plate $j$, an adjustable stop-plate 42 supported by the rods $h$ and moved similarly to the brush boards or stocks to be drilled, an adjustable stud 44 to act as a stop to such stop-plate 42, a shaft $z$ carrying a cam 32 to actuate the said jaws 22 23 and a disk provided with a crank-pin $x$ to move the said plate $j$ backward and forward, a clutch to bring the said shaft $z$ into connection as required with the driving-shaft 5 of the machine, and means to connect the said crank-pin to the said plate $j$ said means consisting partly of a stud 15 passed through a curved slot $q^2$ in a plate $q$ secured to the said plate $j$, all arranged, employed and operating for the purposes and substantially in the manner hereinbefore described.

GEORGE SHAW.
    THOMAS SHAW.
    JOHN PETER DITCHFIELD.

Witnesses:
  ARTHUR E. HALL,
  HOWARD CHEETHAM.